May 12, 1953  L. K. STRAUS  2,638,360
PAYROLL BOARD
Filed Nov. 29, 1950  2 Sheets-Sheet 1
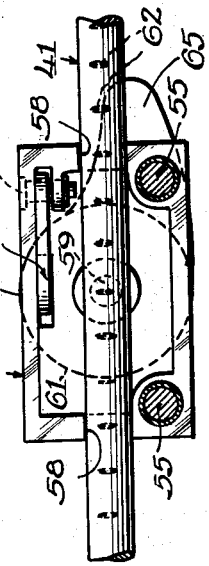
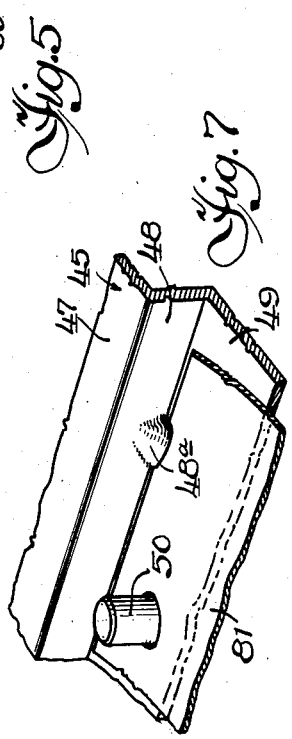
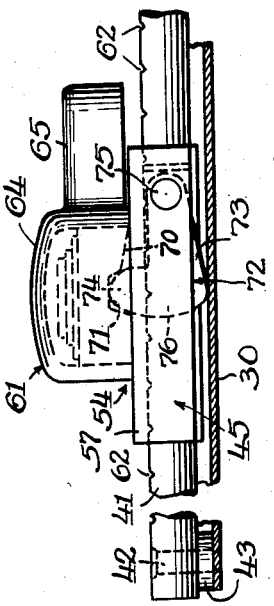
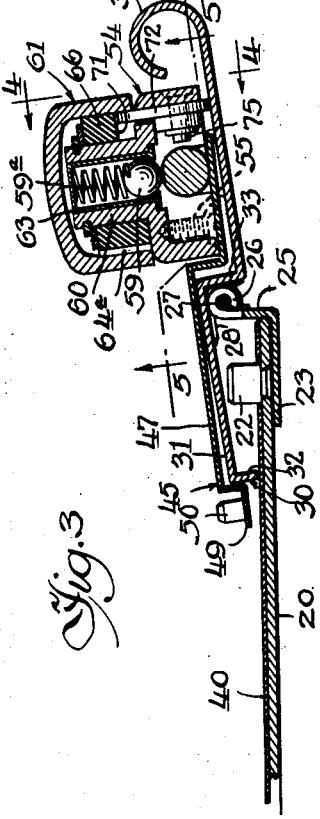
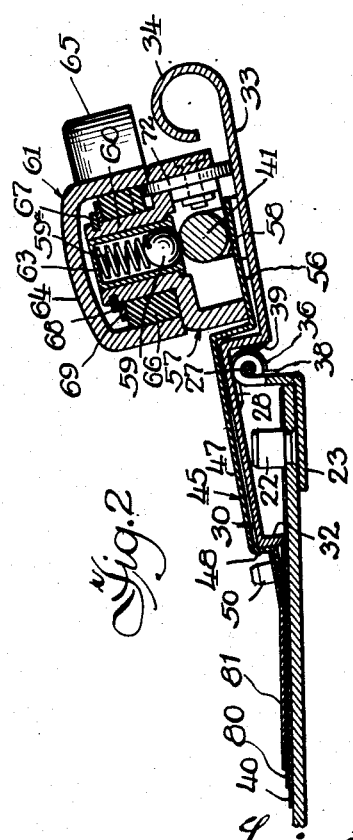
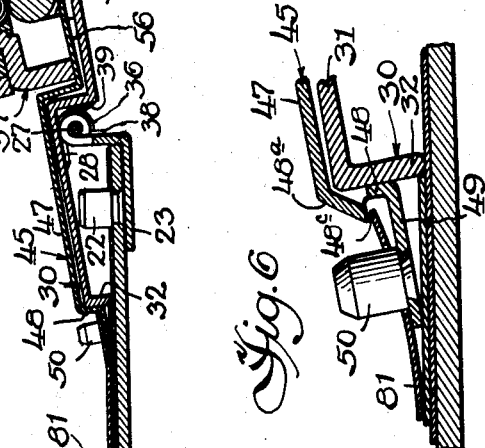
Inventor
Lois K. Straus,
By Parker & Carter
Attys.

Figure 1:
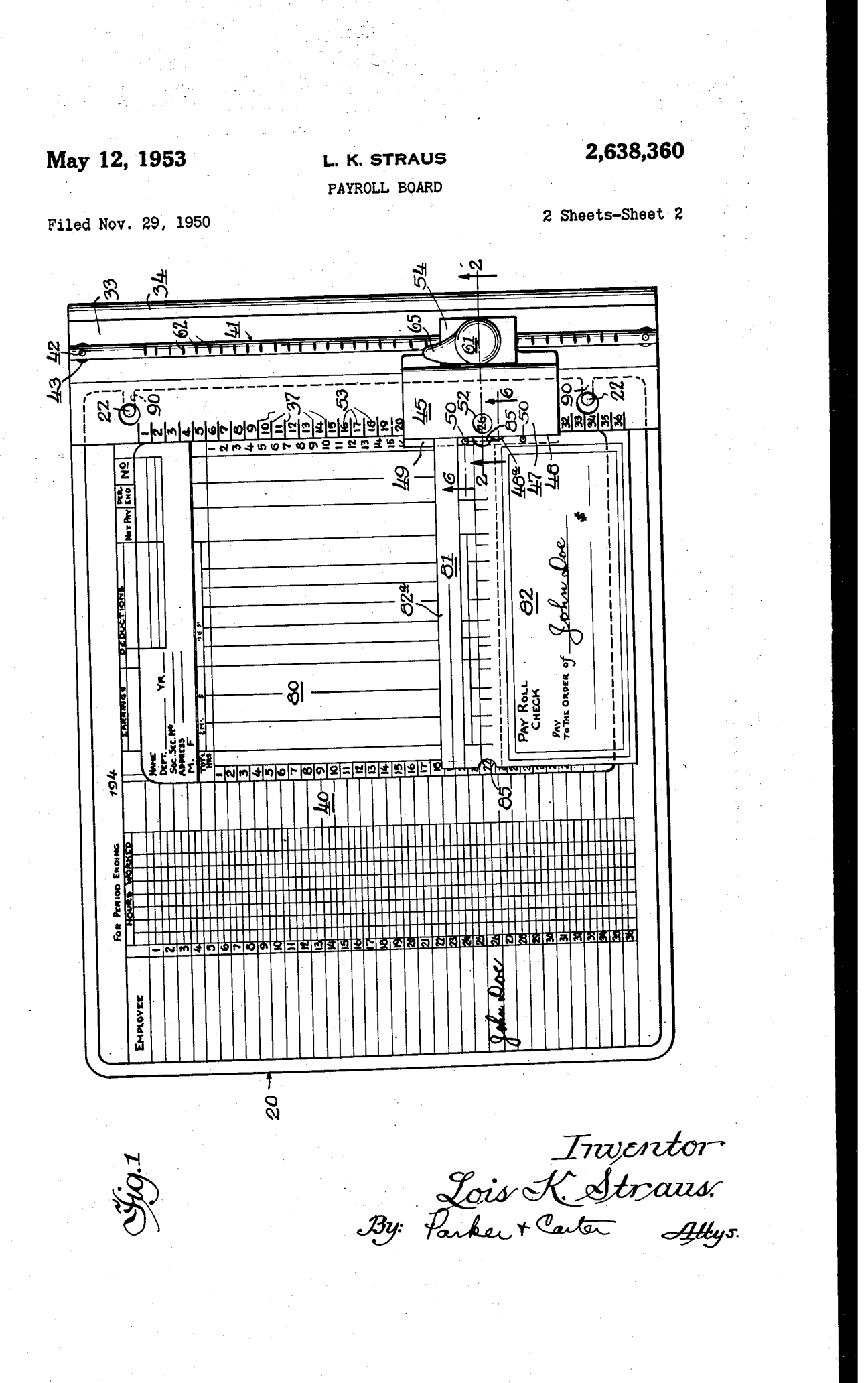

May 12, 1953

L. K. STRAUS 2,638,360

PAYROLL BOARD

Filed Nov. 29, 1950

Inventor
Lois K. Straus.
By: Parker + Carter  Attys.

Patented May 12, 1953

2,638,360

UNITED STATES PATENT OFFICE 2,638,360

PAYROLL BOARD

Lois K. Straus, Great Neck, N. Y., assignor to The Shaw-Walker Company, Muskegon, Mich., a corporation of Michigan Application November 29, 1950, Serial No. 198,155

4 Claims. (Cl. 282—29)

This invention relates to improvements in payroll boards of the kind used for computing wages or salaries payable to employees after allowance or deduction, such as those required to be paid to the Federal Government by the employer.

More particularly, the present invention relates to improvements in the type of payroll board disclosed in my Patent No. 2,485,513, issued on October 18, 1949, wherein a plurality of clamping devices are provided along one side of the payroll board for selectively holding a plurality of different types of paper sheets, said clamping means including a main clamp and a secondary sliding clamp movable along the main clamp into various predetermined positions with respect to the latter. Among the features of my prior payroll board is the provision of spring tension means continuously urging the sliding clamp toward the board surface for gripping certain types of sheets independently of the main clamp.

One of the principal objects of the present invention is to provide an improved construction and method of operation of a payroll board of the general character above described wherein the spring tension means normally operable upon the sliding clamp is dispensed and the clamp is actuated by positive manually controlled means of a novel form, so as to facilitate the operation of the device and minimize the amount of strength required by the hand of the operator both for shifting the sliding clamp to various positions along the board and for actuating the clamp to hold certain sheets in predetermined positions on the board surface.

A further object of the invention is to provide an improved retaining means for sheets detachably positioned on the edge of the sliding clamp.

Other objects of the invention will appear from time to time as the following description proceeds.

The invention may best be understood by reference to the accompanying drawings, in which:

Figure 1 is a plan view of a payroll board constructed in accordance with my invention;

Figure 2 is a detailed section taken on line 2—2 of Figure 1, drawn to a considerably expanded scale;

Figure 3 is a view similar to Figure 2, but showing the auxiliary clamping plate in elevated or released position;

Figure 4 is a fragmentary detailed section taken on line 4—4 of Figure 3;

Figure 5 is a detailed section taken along line 5—5 of Figure 3;

Figure 6 is an enlarged detailed section taken on line 6—6 of Figure 1;

Figure 7 is a fragmentary perspective view of the parts shown in Figure 6.

The embodiment of the present invention illustrated in the drawings is applied to a payroll board of the kind broadly disclosed in Patent No. 2,485,513, having as its principal parts a flat board 20 having positioning studs 22, 22, for one type of paper sheet, adjacent one end thereof, rising above the board. An angle bar 23 is fixed along the edge of the board adjacent the studs 22, said angle bar including an upright leg 25 formed with a plurality of outwardly turned eyes 26 which pivotally support a hinge pin 27. A main clamp 30 is hingedly mounted on said hinge pin by a plurality of eyes 28, 28 fixed as by welding to the under surface of the main clamp 30.

The main clamp 30 extends substantially the full height of the board at one end thereof, and consists of a sheet metal strip, including a generally horizontal main portion 31, having a downwardly extending flange 32 along its inner margin adapted for engagement with the surface of the board, and an outwardly extending, downwardly offset portion 33 beyond the point of hinged connection with the angle bar 23. The outwardly extending portion 33 terminates in an upwardly curled edge portion 34.

The inner flange 32 of the main clamp 30, and the pivotal supports for said clamp, are arranged above the top surface of the board so that the main portion 31 of said clamping member extends over the top of the studs 22, 22 at all times. Tension means are provided for normally urging the clamping member toward the surface of the board; in the form shown herein, said tension means consist of a plurality of coil springs 36, 36 mounted on the hinge pin 27 with tangential end portions 38, 39 engaging the outer face of the angle bar 23 and the offset portion 33 of the clamping bar, respectively.

The main clamp 30 is provided with a series of horizontal lines 37 numbered consecutively, stamped or otherwise applied along its inner clamping edge adjacent the clamping flange 32. These lines are disposed for alignment with correspondingly numbered, horizontally ruled spaces on a summary sheet 40 when the latter is applied to the payroll board, as will hereinafter more fully appear.

On the outwardly extending portion 33 of the main clamp is mounted a cylindrical rod 41 spaced slightly above said portion by fastening bolts 42, 42 at opposite ends of the latter, and spaced therefrom by washers 43, 43. Said rod is disposed parallel to and intermediate the main portion 31 of the clamping member and the curled outer edge thereof. Said rod has a secondary clamp 45 slidably mounted thereon.

Referring now to details of the secondary or sliding clamp 45, to which the present invention is mainly directed, said clamp is of considerably less width than the main clamp 30. As shown herein, it consists of a sheet metal base conforming generally in transverse cross-section to the upper surface of the main clamp 30 and includes a main portion 47 overlying the main portion 31 of the main clamp, a depending inner portion or shoulder 48 conforming to and overlying the terminal flange 32 of the main clamp, and a terminal flange 49 along its inner edge adapted to afford clamping action relative to the upper surface of the board independently of said main clamp. This terminal flange 49 of the sliding clamp is provided with a plurality of studs 50, 50, herein two in number, in spaced relationship therealong.

In the novel form of device disclosed herein, the depending portion 48 is also provided with a small retaining lip 48a having an outwardly inclined upper surface and an abrupt under face 48c spaced slightly above the clamping flange 49 of the sliding clamp, and intermediate the two studs 50, 50, as shown in Figure 1. The under face 48c is provided to retain the edge of paper sheets which may be temporarily positioned on the studs 50, 50 as will hereinafter be more fully described.

The auxiliary or slide clamp 45 is controlled for sliding movement along the rod 41 by a carriage of novel form, indicated generally at 54, suitably secured as by screws 55, 55 to an outwardly projecting, downwardly offset extension 56 of said slide clamp. The carriage 54 has a hollow base portion 57 with opposed recesses 58, 58 at the sides of its open under face, adapted to receive the rod 41 in sliding engagement therein. The outwardly extending projection 56 of the slide clamp extends in sliding engagement beneath the rod.

The hollow base portion 57 of carriage 54 has a centrally disposed, upwardly extending hollow bearing sleeve 60 which forms a bearing support for an operating knob, indicated generally at 61. Within the hollow sleeve 60 is mounted a spring-pressed ball 59, said ball being adapted to engage in any one of a plurality of notches 62, 62 formed along the top surface of the rod 41. These notches are disposed to correspond with the several aligning numerals 53, 53 along the inner edge of the clamp so that the operator can readily adjust the slide clamp 45 along the main clamp to a desired aligned position, whereupon the sliding clamp will be temporarily held in that position until positively moved to another desired position along the rod 41.

In the form shown herein, the base portion 57 and the cylindrical bearing sleeve 60 are preferably cast of a suitable plastic material and the spring-pressed ball 59 with its spring 59a is mounted within a metal thimble 63 concentric with the bearing sleeve 60.

The operating knob 61 comprises a hollow cap 64 having an extension arm 65 at one side thereof arranged for manual rotation of said operating knob. Said operating knob is fixed to an annular cam ring 66 which fits within the hollow portion of said knob, and has bearing about the bearing sleeve 60 on base portion 57. The cam ring 66 is rotatably secured on the bearing sleeve 60 by a spring-retaining ring 67 adapted to engage in an annular groove 68 formed about the upper end of the bearing sleeve 60 and engaging a bearing washer 69 fitting over the upper face of the cam ring 66.

In the form shown herein, the cap 64 is keyed at 64a to the periphery of cam ring 66 and detachably mounted on the latter for ease in assembly of the parts.

The cam ring 66 has a cam surface 70 on its under face adapted to be engaged by a push member 72 guided for vertical movement with respect to the carriage 54 and adapted to engage the upper surface of the main clamp 30 beyond the outer edge of the extension 56 on which said carriage 54 is mounted. In the form shown herein, the push member 72 consists of a bell crank arm 73 having one leg 74 pivotally mounted for vertical swinging movement on a pivot pin 75 offset laterally toward one end of the base member 57 and having the other leg 76 extending upwardly for engagement with the cam surface 70 of the cam ring 66. The cam surface terminates at its upper end in a recess 71 to give the sliding clamp substantial freedom for rocking movement relative to the board when the operating lever 65 is in fully released position, as shown in Figure 4.

The use and operation of the device described above is as follows:

The payroll summary sheet 40 is inserted under the main clamp 30 as usual by lifting the latter against tension so that notches 90, 90 on the edge of the summary sheet register with the studs 22, 22 on the board which form locating lugs for said sheet. When the clamp is released, the inner flange 32 descends and holds the sheet firmly on the board.

The employees' names and number of hours each has worked are entered in the proper spaces on the payroll sheet 40. When these daily entries are complete and summarized, the work of filling out the pay slips with carbon transfers to the individual earning sheet 80 and the payroll summary sheet 40 can begin. In the example shown in Figure 1, the various sheets are positioned to make out the pay record for John Doe for payroll period No. 22.

John Doe's name happens to be listed on the payroll summary sheet 40 in space number 26. Therefore, the slot clamp 45 is moved along the rod 41 until it clicks into position with the number 26 on the main clamp appearing through the circular aperture 52 in the slide clamp.

The operating lever 65 on the slide clamp 45 is normally swung to fully released position shown in Figures 3 and 4 where the arm 73 of the push lever 72 is engaged in the recess 71 of the cam ring 66. In this position, the slide clamp 45 can be easily rocked rearwardly against gravity by applying a slight rearward pressure on the knob 61. This raises the clamping flange 49 of the slide clamp from the payroll sheet 40 on the board surface and permits John Doe's individual earning sheet 80 to be inserted under the flange 49 of the slide clamp, with the edge of said earning sheet engaging the straight edge flange 32 of the main clamp 30. The earning sheet 80 is provided with a series of consecutive numbered spaces along both edges thereof, which spaces indicate the number of the various payroll periods for John Doe. Therefore, when John Doe's earning sheet is inserted under the slide clamp, it is positioned so that the particular number of payroll period being entered is located in the cut-out notch 51 on the flange 49 of the slide clamp. To hold the earning sheet in place on the board, the lever arm 65 is then rotated so that the push lever 72 is moved downwardly by engagement with the cam surface 70. This causes the slide clamp to be rocked in a counterclockwise direction to move the clamping flange 49 into engagement with the earning sheet, to hold the latter in correct position over the payroll summary sheet, as shown in Figures 1 and 2. The wedging angle of the cam surface 70 with respect to the push lever 72 is such that the slide clamp will remain in clamping position until the operator releases it by positive rotation of the operating lever 65.

Next, John Doe's pay slip 81 is placed in position over the two locating pins 50, 50 on the upper edge of the clamping flange 49 as shown in Figures 1 and 2. The pay slip is provided with a pair of cut-out portions or notches 85, 85 along its opposite edges so as to permit the operator to see the number of the payroll period being recorded, thus affording a visual check as to the correct positioning of the various papers on which entries are to be made. On the obverse side of the pay slip 81 is incorporated a band of transfer material or carbon so that, when entries are made on the pay slip for John Doe, they are reproduced simultaneously on John Doe's earning sheet 80 and, through a carbon sheet back of the earning sheet, they are also reproduced on the summary sheet 40 in John Doe's space.

In the form of pay slip shown in Figure 1, said pay slip also, for convenience, includes as a part thereof a payroll check 82 separable by a perforated line from the upper portion 82a on which the several entries are made for John Doe's check. The net pay indicated and entered on the upper portion of the pay slip may then be copied directly to John Doe's payroll check and the check portion can later be detached from the upper portion for individual payment to John Doe.

It will be understood that, by reason of the small retaining lip 48a on the depending portion 48 of the slide clamp and the positioning of this retaining lip between the two positioning studs 50, 50 as herein disclosed, the edge of the pay slip 81, including its separable portions 82 and 82a, is readily inserted for positioning on the studs 50, 50 by initially applying the edge of the pay slip in a substantially upright position between the studs 50, 50 and the adjacent depending shoulder portion 48 of the slide clamp, and thereafter lowering the pay slip so as to pass the studs 50, 50 through the holes along the edge of said pay slip. As a result, the extreme edge of the pay slip will normally be positioned beneath the under face 48c of the retaining lip 48a so as prevent accidental displacement of the pay slips from the studs 50, 50 as may often occur when said pay slips tend to curl up along their edges.

The arrangement is such however that the pay slip can be readily removed by reversing the operation just described for applying it to the positioning studs.

Although I have shown and described certain embodiments of my invention, it will be understood that I do not wish to be limited to the exact construction shown and described, but that various changes and modifications may be made without department from the spirit and scope of the invention as defined in the appended claims.

I claim:

1. In a writing board, a straight edge member hinged to one edge of said board and extending in clamping position thereover, a secondary clamping member slidably mounted above and along said straight edge member, said straight edge member having a clamping portion overhanging the inner edge of said straight edge member and including an upright shoulder and a terminal clamping flange disposed at a substantially right angle to said shoulder, a pair of upright positioning pins fixed on said terminal flange in horizontally spaced relation to said upright shoulder, and a retaining lip fixed on said shoulder disposed between said positioning pins and spaced above said clamping flange for detachably retaining the edge of a paper sheet by flexing of said sheet between said lip and flange when the sheet is positioned on said pins and resting on the upper face of said flange, said retaining lip having an abrupt under face generally parallel with the upper face of the clamping flange and an upwardly inclined upper surface merging into the upright shoulder of said straight edge member.

2. In a writing board having a straight edge member hinged to one edge of the board and extending inwardly thereover, with means for normally urging said straight edge member toward said board, a bearing rod extending longitudinally along said straight edge member outwardly of its hinge connection to the board, a clamp member slidably and rockably mounted on said bearing rod and having a clamping flange projecting inwardly beyond said straight edge member and over said board, said clamping member being normally free for rocking movement on said bearing rod toward and away from said straight edge member and said board, a cam member rotatably mounted on said clamping member and extending upwardly therefrom on a generally upright axis immediately above said bearing rod, a manual control lever on said cam member swingable above and generally parallel to the upper face of said clamping member, and a push member guided on said clamping member for movement toward and away from said straight edge member and adapted to be engaged by said cam member for urging said clamping member into clamping relation with said board in any permissible position of sliding adjustment of said clamping member along said bearing rod.

3. In a writing board, a straight edge member hinged to one edge of the board and extending inwardly thereover, means for urging said straight edge member toward said board, a clamping member slidably mounted above and along said straight edge member and having a clamping flange projecting inwardly beyond the latter and over said board, said clamping member including a carriage normally free for rocking movement toward and away from said straight edge member and said board, a cam member rotatably mounted on said carriage on a generally upright axis, a manual control lever for said cam member swingable above and across said carriage, a push member guided on said carriage for movement toward and away from said straight edge member and adapted to be engaged by said cam member for urging said clamping flange into clamping relation with said board in any permissible position of sliding adjustment of said clamping member along said straight edge member, and the cam member consisting of a ring pivotally mounted on an upwardly extending bearing on said carriage, said ring being secured for rotation by detachable means mounted on the upper end of said bearing, and the manual control lever including a hollow cap fitted over said bearing and said cam member and detachably connected to the latter.

4. A writing board construction in accordance with claim 3, wherein the push member consists of an arm pivotally mounted on the carriage and having a swinging end in position for engagement by the cam member as the latter is rotated.

LOIS K. STRAUS.

References Cited in the file of this patent

UNITED STATES PATENTS

| Number | Name | Date |
| --- | --- | --- |
| 869,880 | Conrad | Nov. 5, 1907 |
| 1,154,260 | Litscher | Sept. 21, 1915 |
| 2,485,513 | Straus | Oct. 18, 1949 |
| 2,511,592 | Krafczyk | June 13, 1950 |
| 2,529,302 | Manuel | Nov. 7, 1950 |